United States Patent
Lu et al.

(10) Patent No.: US 7,499,859 B2
(45) Date of Patent: Mar. 3, 2009

(54) VIDEO DEVICE WITH VOICE-ASSISTED SYSTEM

(75) Inventors: Yuan-Chia Lu, Hualien County (TW); Liang-Sheng Huang, Taipei (TW); Jia-Lin Shen, Taipei County (TW)

(73) Assignee: DELTA Electronics, Inc., Taoyuan Hsien (TW)

( * ) Notice: Subject to any disclaimer, the term of this patent is extended or adjusted under 35 U.S.C. 154(b) by 678 days.

(21) Appl. No.: 10/709,333

(22) Filed: Apr. 29, 2004

(65) Prior Publication Data

US 2005/0177359 A1 Aug. 11, 2005

(30) Foreign Application Priority Data

Feb. 9, 2004 (TW) .............................. 93102895 A

(51) Int. Cl.
*G10L 11/00* (2006.01)
*G10L 15/00* (2006.01)
*G10L 15/18* (2006.01)
*G06F 3/16* (2006.01)
*H04N 5/455* (2006.01)

(52) U.S. Cl. .................. 704/270; 704/235; 704/257; 715/728; 725/37

(58) Field of Classification Search .................. 704/200
See application file for complete search history.

(56) References Cited

U.S. PATENT DOCUMENTS

| 5,600,765 | A | * | 2/1997 | Ando et al. .................. 345/668 |
| 5,748,191 | A | * | 5/1998 | Rozak et al. ................. 715/728 |
| 6,133,904 | A | * | 10/2000 | Tzirkel-Hancock ......... 345/589 |
| 6,415,257 | B1 | * | 7/2002 | Junqua et al. ............... 704/275 |
| 6,718,308 | B1 | * | 4/2004 | Nolting ....................... 704/275 |
| 2003/0083577 | A1 | * | 5/2003 | Greenberg .................. 600/437 |
| 2004/0172258 | A1 | * | 9/2004 | Dominach et al. .......... 704/277 |

* cited by examiner

*Primary Examiner*—David R Hudspeth
*Assistant Examiner*—Brian L Albertalli
(74) *Attorney, Agent, or Firm*—Jianq Chyun IP Office

(57) ABSTRACT

A video device with a voice-assisted system is provided by using a voice command to adjust the images. The voice-assisted system includes a voice recognition engine and a control unit. The voice recognition engine receives a voice command and outputting a voice signal based on the voice command to the control unit. The control unit based on the voice signal performs the adjustment actions to adjust image. The user only requires inputting a single voice command. The voice recognition engine then can perform a series of actions to adjust image. Therefore, the voice-assisted system can enhance the convenience of adjusting the image of the video device and reduce the operation complexity for the user.

32 Claims, 3 Drawing Sheets

VIDEO DEVICE WITH VOICE-ASSISTED SYSTEM

CROSS REFERENCE TO RELATED APPLICATIONS

This application claims the priority benefit of Taiwan application serial no. 93102895, filed on Feb. 9, 2004.

BACKGROUND OF INVENTION

1. Field of the Invention

This invention generally relates to a video device with a voice-assisted system and a method thereof for adjusting images, and more particularly to a video device based on voice input to adjust images and a method thereof.

2. Description of Related Art

As the technology advances, the electronic appliance in our daily life, the automated equipment in the working places, and the electronic devices for the entertainment purposes show that people highly rely on the electronic devices over time. Among them, video devices are widely used and become indispensable either in daily life or for work. The most common video devices are for example television sets, computer, projectors, etc.

To provide video enjoyment for the users, the video devices generally provide on-screen display (OSD) function to display the image parameters on the screen so that the users can adjust the parameters as needed. As the technology advances, the functions provided by the video devices increase significantly. Hence, it is necessary to classify those functions and video parameters on the OSD into different categories.

FIG. 1 is a conventional method for adjusting images in a video device with OSD. Referring to FIG. 1, there are several levels in the OSD menu. Even if the user would like to slightly adjust one image parameter, she/he has to use the button to enter into several levels of architecture in order to reach the very level the parameter is located. For example, when the user wants to adjust one image parameter, she/he has to push the button to select entering into the second level from the main menu. Then she/he has to set the command in the second level based on what she/he wants to adjust and the menu goes to the third level. Then the user has to do the corresponding action based on the command she/he selected. For example, if the user wants to adjust the brightness, the user has to select "Brightness" in the main menu. Under the directory of "Brightness", there are two sub-directories "brightness" and "contrast". After selecting "brightness", the user finally can adjust the brightness under the sub-directory of "brightness". In addition, there is no universal standard for classifying image parameters. I.e., the same parameter may be classified into different directories in products manufactured by different companies. For those who are not familiar with the adjustment operation, it is very inconvenient to go through so many levels of directories in order to adjust the image parameters.

To solve the above problem, it would be helpful for the users to adjust the parameters based on voice command. By using the voice command control procedure, the users can make the commands directly to the video device so that the voice device can automatically perform the actions corresponding to the voice commands without pushing any button. However, in the conventional voice command control system, a single voice only corresponds to one action. I.e., if the user want the voice device to perform a series of actions, she/he has to make several voice commands, which still lacks flexibility.

SUMMARY OF INVENTION

An object of the present invention is to provide a video device with a voice-assisted system and a method thereof by using a voice command to adjust images.

Another object of the present invention is to provide a video device with a voice-assisted system and a method thereof for adjusting images so that it is more convenient for the user to adjust images without giving a series of commands and worrying about the voice recognition error.

The present invention provides a method for adjusting images, suitable for adjusting a video device with a voice-assisted system, the video device providing an on-screen display function, the method comprising: receiving a voice command; recognizing the voice command and outputting a voice signal based on a result of recognizing the voice command; and identifying the voice command as one of a specific command and a fuzzy command based on the voice signal.

In a preferred embodiment of the present invention, wherein if the voice command is the specific command, the method further comprises performs one adjustment action corresponding to the voice command.

In a preferred embodiment of the present invention, if the voice command is the fuzzy command, the method further comprises performs a plurality of adjustment actions corresponding to the voice command.

In a preferred embodiment of the present invention, before the identifying step, further comprising: performing a confidence measure of the voice signal, outputting an estimation level based on the confidence measure, and comparing the estimation level with a predetermined estimation threshold. The comparing step includes: if the estimation level is higher than the predetermined estimation threshold, directly going to the step of identifying the voice command as a specific command or a fuzzy command based on the voice signal; if the estimation level is lower than the predetermined estimation threshold, displaying a plurality of commands based on the voice signal, the similarity of the plurality of commands to the voice signal is higher than a predetermined value, selecting one of the plurality of commands, and going to the step of identifying the voice command as the specific command or the fuzzy command based on the voice signal.

In a preferred embodiment of the present invention, if the similarity of the plurality of commands to the voice signal is higher than a predetermined value, the step of selecting one of the plurality of commands includes selecting one of the plurality of commands by a voice input or by a button input.

In a preferred embodiment of the present invention, if the voice command is the fuzzy command, the method further comprises finding the plurality of adjustment actions corresponding to the voice command from a command database.

In a preferred embodiment of the present invention, if the voice command is the fuzzy command, the method further comprises displaying the performed adjustment actions corresponding to the voice command via the on-screen display function. After the step of displaying the performed adjustment actions corresponding to the voice command, further comprising a selectively image modification process.

The present invention provides a video device with a voice-assisted system, comprising: a voice recognition engine receiving a voice command and outputting a voice signal based on the voice command; an on-screen display control interface, coupled to the voice recognition engine for receiving the voice signal; a display control unit, coupled to the on-screen display control interface; and a display unit coupled to the display control unit, the on-screen display control interface based on the voice signal identifying the voice command as one of a specific command and a fuzzy command.

In a preferred embodiment of the present invention, if the voice command is the specific command, the display control unit performs an adjustment action corresponding to the voice command to adjust an image displayed on the display unit.

In a preferred embodiment of the present invention, if the voice command is the fuzzy command, the display control unit performs a plurality of adjustment actions corresponding to the voice command to adjust the image displayed on the display unit.

In a preferred embodiment of the present invention, it further comprises a confidence measure unit performing a confidence measure of the voice signal, outputting an estimation level based on the confidence measure, and comparing the estimation level with a predetermined estimation threshold. When comparing the estimation level with the predetermined estimation threshold, if the estimation level is higher than the predetermined estimation threshold, the on-screen display control interface directly identifies the voice command as one of a specific command and a fuzzy command based on the voice signal; if the estimation level is lower than the predetermined estimation threshold, the on-screen display control interface displays a plurality of commands based on the voice signal, the similarity of the plurality of commands to the voice signal is higher than a predetermined value, the on-screen display control interface selects one of the plurality of commands, and the on-screen display control interface identifies the voice command as one of the specific command and the fuzzy command based on the voice signal.

In a preferred embodiment of the present invention, if the similarity of the plurality of commands to the voice signal is higher than a predetermined value, the on-screen display control interface selects one of the plurality of commands via a voice input through the voice recognition engine, or via a button input of the video device.

In a preferred embodiment of the present invention, if the voice command is the fuzzy command, the voice recognition engine finds the plurality of adjustment actions corresponding to the voice command from a command database.

In a preferred embodiment of the present invention, if the voice command is the fuzzy command, the on-screen display control interface displays performed adjustment actions corresponding to the voice command via the on-screen display function. After displaying the performed adjustment actions corresponding to the voice command via the on-screen display function, the on-screen display control interface performs a selectively image modification process.

The present invention provides a video device with a voice-assisted system, comprising: a voice recognition engine receiving and recognizing a voice command and outputting a recognition result, the voice recognition engine including a confidence measure unit performing a confidence measure of the voice signal, outputting an estimation level based on the confidence measure, comparing the estimation level with a predetermined estimation threshold to output a voice signal; an on-screen display control interface, coupled to the voice recognition engine, receiving the voice signal; a display control unit coupled to the on-screen display control interface; and a display unit coupled to the display control unit, the on-screen display control interface based on the voice signal identifying the voice command as one of a specific command and a fuzzy command.

In a preferred embodiment of the present invention, if the voice command is the specific command, the display control unit performs an adjustment action corresponding to the voice command to adjust an image displayed on the display unit.

In a preferred embodiment of the present invention, if the voice command is the fuzzy command, the display control unit performs a plurality of adjustment actions corresponding to the voice command to adjust the image displayed on the display unit.

In a preferred embodiment of the present invention, when comparing the estimation level with the predetermined estimation threshold, if the estimation level is higher than the predetermined estimation threshold, the on-screen display control interface directly identifies the voice command as a specific command or a fuzzy command based on the voice signal; if the estimation level is lower than the predetermined estimation threshold, the on-screen display control interface displays a plurality of commands based on the voice signal, the similarity of the plurality of commands to the voice signal is higher than a predetermined value, the on-screen display control interface selects one of the plurality of commands, and the on-screen display control interface identifies the voice command as one of the specific command and the fuzzy command based on the voice signal.

In a preferred embodiment of the present invention, if the similarity of the plurality of commands to the voice signal is higher than a predetermined value, the on-screen display control interface selects one of the plurality of commands via a voice input through the voice recognition engine, or via a button input of the video device.

In a preferred embodiment of the present invention, if the voice command is the fuzzy command, the voice recognition engine finds the plurality of adjustment actions corresponding to the voice command from a command database In a preferred embodiment of the present invention, if the voice command is the fuzzy command, the display control unit displays performed adjustment actions corresponding to the voice command via the on-screen display function. After displaying the performed adjustment actions the plurality of adjustment actions corresponding to the voice command via the on-screen display function, the on-screen display control interface performs a selectively image modification process.

The video device with a voice-assisted system and the method thereof for adjusting images of the present invention can use a single voice command to perform the image adjustments. Hence, it is more convenient for the users to operate. Further, when the user gives the voice command but video device does not act responsive to the voice command, the present invention can make the video device perform a series of actions for adjusting images by analyzing and comparing the voice command. After performing the image adjustment, those actions performed by the video device will be shown on the screen for the user to fine-tune the image parameters. Hence, the method for adjusting images of the present invention is more flexible than the conventional method and thus can effectively reduce the operation complexity for the users.

In addition, because the voice-assisted system of the present invention includes a confidence measure unit to evaluate the recognition result performed by the voice recognition engine, it can prevent wrong actions due to the low recognition rate so that the reliability of the system can be significantly improved.

The above is a brief description of some deficiencies in the prior art and advantages of the present invention. Other features, advantages and embodiments of the invention will be apparent to those skilled in the art from the following description, accompanying drawings and appended claims.

DETAILED DESCRIPTION

Figure 1:
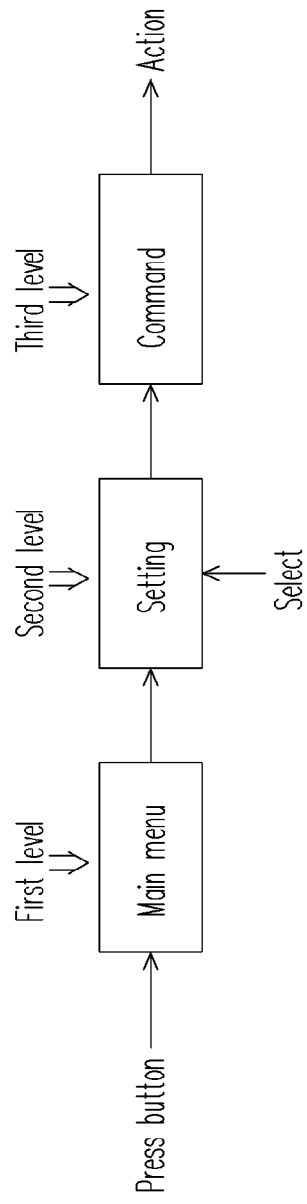
FIG. 1 is a conventional method for adjusting images in a video device with OSD.

The present invention provides a video device with a voice-assisted system and a method thereof for adjusting images, which perform the image adjustment via a voice command. Unlike the conventional art, the video device with a voice-assisted system and the method thereof are more convenient for the user to adjust images without giving a series of commands and worrying about the voice recognition error.

The video device with a voice-assisted system of the present invention comprises a voice recognition engine, an OSD control interface, a display control unit and a display unit. The voice recognition engine receives a voice command from the user and outputs a voice signal based on the voice command to the OSD control interface. The on-screen display control interface is coupled to the voice recognition engine. The display control unit is coupled to the on-screen display control interface. The display control unit controls the display of the display unit.

The method for adjusting images via the video device with a voice-assisted system comprises: receiving a voice command from the user; recognizing the voice command and outputting a voice signal based on a result of recognizing the voice command; and identifying the voice command as a specific command or a fuzzy command based on the voice signal. If the voice command is the specific command, then it performs one adjustment action corresponding to the voice command. If the voice command is the fuzzy command, it performs a plurality of adjustment actions corresponding to the voice command and displays the performed adjustment actions. Further, if the adjusted image does not meet users expectation, the user can further modify the image based on the performed adjustment actions. The image modification process can be performed by voice command or button command.

In the method for adjusting images via the video device with a voice-assisted system of the present invention, the specific command means a specific operating action. This operating action can adjust a specific category of the image. Those specific categories can be stored in for example the voice recognition engine or the OSD control interface, depending on the design requirement. If this specific command, for example, is "increase the brightness", then this specific command can directly adjust the brightness. In an embodiment of the present invention, the specific command can also include the adjustment amount of the parameter. For example, the voice command is "increase the brightness by 10%". Such a specific command can directly increase the brightness by 10%.

In the method for adjusting images via the video device with a voice-assisted system of the present invention, the fuzzy command means a plurality of adjustment commands. Those commands correspond a plurality of operating actions. Those operating actions can be stored in the voice recognition engine, the OSD control interface, or an independent command database, depending on the design requirement. For example, if the fuzzy command is "the image is blurring", this fuzzy command can refer to the command set stored in the command database and perform a series of actions such as adjusting brightness, color, etc. In an embodiment of the present invention, the series of actions can also include the adjustment step value of the parameters. For example, for the brightness, it will be increased by 5% (or other value depending on the design) each time.

Figure 2:
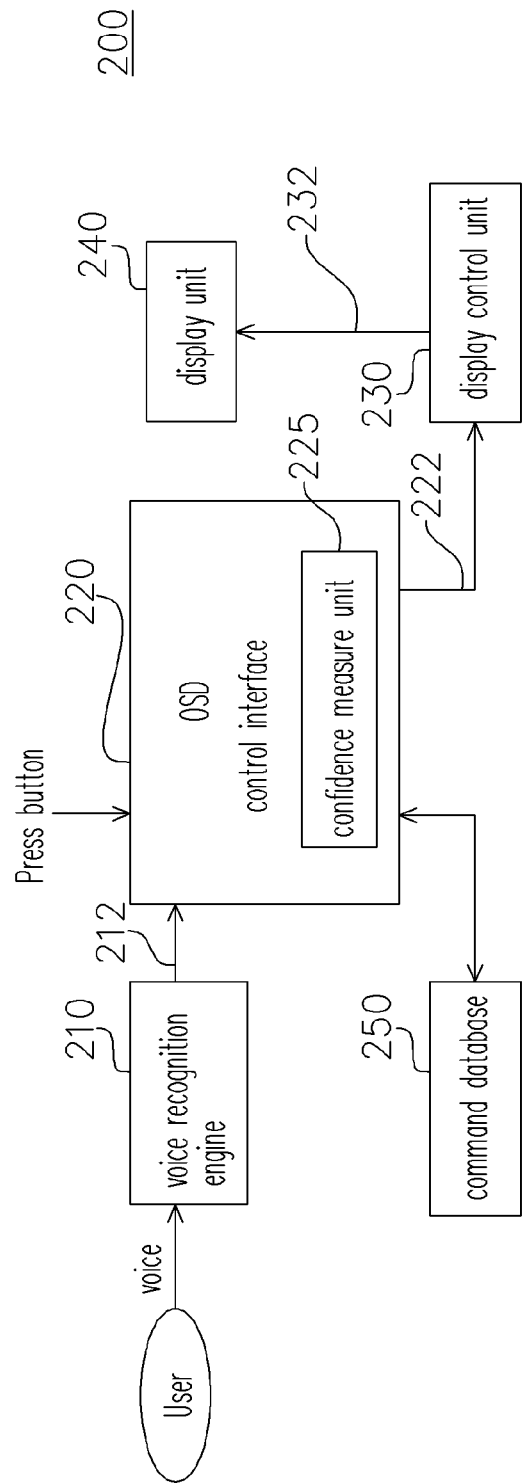
FIG. 2 is block diagram of a video device with a voice-assisted system in accordance with a preferred embodiment of the present invention.

FIG. 2 is block diagram of a video device with a voice-assisted system in accordance with a preferred embodiment of the present invention. Referring to FIG. 2, the video device 200 comprises a voice recognition engine 210, an OSD control interface 220, a display control unit 230 and a display unit 240. The voice recognition engine 210 is coupled to the OSD control interface 220. The display control unit 230 is coupled to the on-screen display control interface 220. The display control unit 230 controls the display of the display unit 240.

When the user gives a voice command, the voice recognition engine 210 will recognize the voice command. After recognition, the voice recognition engine 210 will output a voice signal 212 based on the recognition result to the OSD control interface 220. When the OSD control interface 220 receives the voice signal 212, it will give a command to the display control unit 230 based on the voice signal 212 in order to adjust the image as the user desires. In an embodiment of the present invention, the video device 200 further includes a command database 250 coupled to the OSD control interface 220. The OSD control interface 220 can find the commands corresponding to the voice signal 212 from the command database 250.

The method for adjusting images via the video device with a voice-assisted system of the present invention can use the structure of the video device 200 as shown in FIG. 2. For example, when the voice recognition engine 210 determines that the voice signal 212 is a specific command such as "increase the contrast to 60%", the OSD control interface 220 based on the received voice signal directly gives a command to the display control unit 230 asking it to perform the corresponding adjustment action to adjust the image. I.e., the display control unit 230 of the video device 200 will adjust the contrast to 60% based on the voice command.

On the other hand, when the voice recognition engine 210 determines that the voice signal 212 is a fuzzy command such as "the image is blurring", the OSD control interface 220 will analyze and compare the command, and then refers to the command set stored in the command database 250 in order to generate a series of commands. The display control unit 230 then based on the series of commands performs a plurality of adjustment actions such as adjusting the contrast, brightness, color, and the size of the image, etc. In an embodiment of the present invention, it can display the performed actions on the display unit 240 for the users reference. In another embodiment of the present invention, if the adjusted image does not meet the users expectation, the user can modify the image based on the displayed actions.

It should be noted that currently the voice recognition technology still couldn't reach 100% recognition rate. Hence, in a preferred embodiment of the present invention in FIG. 2, a confidence measure unit 225 can selectively be added for evaluating the recognition result in order to raise the reliability of the system. The function and the purpose of the confidence measure unit 225 will be described as follows.

Referring to FIG. 2, in an embodiment of the present invention, the confidence measure unit 225 can be designed into the OSD control interface 220. The voice recognition engine 210 will output the recognition result "score" to the OSD control interface 220 via the voice signal 212. The confidence measure unit 225 then evaluates the recognition result from the voice recognition engine 210 and outputs an estimation level corresponding to the recognition result. The estimation level then will be compared to the estimation threshold. The estimation level represents the similarity of recognition result to the corresponding voice signals in the command database.

If the estimation level is higher than the estimation threshold, then the OSD control interface 220 determines whether it is a specific command or a fuzzy command. If it is a specific command, the display control unit 230 performs the subsequent adjustment action corresponding to this specific command.

If the estimation level is lower than the estimation threshold, then the OSD control interface 220 via the display control unit 230 displays on the display unit 240 several similar recognition results previously inputted by the user (i.e., the recognition results having higher similarity to this command) for the users choice. The user can give a voice command and press the button to select the correct recognition result. The present invention is not limited those two methods of selection. After the user makes the selection, if it is a specific command, the display control unit 230 performs the subsequent adjustment action corresponding to this specific command. If it is a fuzzy command, the OSD control interface 220 will find, from the command database 250, the command set corresponding to the fuzzy command. Then the display control unit 230 performs the subsequent adjustment actions corresponding to this fuzzy command.

In light of the above, the video device with a voice-assisted system can easily adjust the images. The method for adjusting images by using the voice-assisted system will be described as follows.

Figure 3:
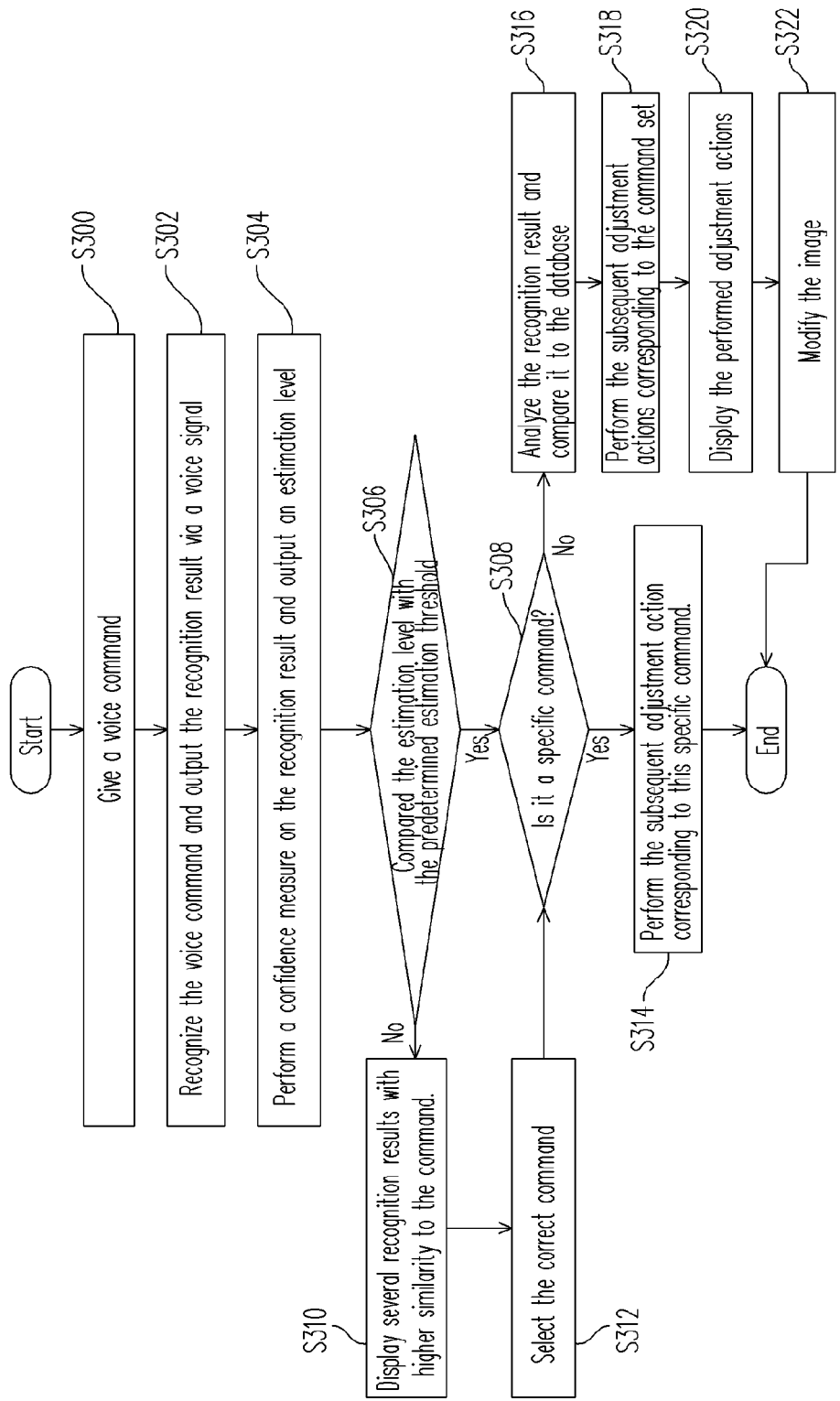
FIG. 3 a flow chart of a method for adjusting images in accordance with a preferred embodiment of the present invention.

FIG. 3 a flow chart of a method for adjusting images in accordance with a preferred embodiment of the present invention. First, the user gives a voice command (S300). Then, the voice command is recognized and a recognition result is outputted via a voice signal (S302). After that, a confidence measure on the recognition result is performed and an estimation level is outputted (S304). Then the estimation level is compared to the predetermined estimation threshold (S306).

If the estimation level is higher than the estimation threshold, then the system will directly determine whether the voice command is a specific command (S308). If the estimation level is lower than the estimation threshold, then the system will display several similar recognition results previously inputted by the user (i.e., the recognition results having higher similarity to this command) for the users choice (S310). The user then selects the correct command (S312) and the flow chart goes to S308. If the recognized command (by the system) or selected command (by the user) is a specific command, the system performs the subsequent adjustment action corresponding to this specific command. (S314).

If the recognized command (by the system) or selected command (by the user) is not a specific command, the recognition result will be analyzed and compared to the database to find a corresponding command set corresponding to a series of adjustment actions (S316). Then the system performs the subsequent adjustment actions corresponding to this command set to adjust the images. (S318). The system then displays the performed adjustment actions (S320). The user can accept the adjusted image or can further adjust the images based on the performed adjustment actions.

It should be noted that in step S312, the user can give a voice command or press the button to select the correct command. However, the present invention is not limited to those two methods of selection.

In step S308, if it is determined that the recognition result is a specific command such as "adjust the brightness to 30", then the system performs the subsequent adjustment action corresponding to this specific command to adjust the images (S314). On the other hand, in step S308, if it is determined that the recognition result is a fuzzy command such as "the image is blurring", then the recognition result will be analyzed and compared to the database to find a corresponding command set corresponding to a series of adjustment actions (S316). Then the system performs the subsequent adjustment actions such as adjust the contrast, brightness, color, size of the image, etc., corresponding to this command set to adjust the images. (S318). The system then displays the performed adjustment actions (S320). If the adjusted image does not meet users expectation, the user can further modify the image based on the performed adjustment actions.

The image modification process (S322) can be performed by voice command or button command, depending on the desire of the user. However, the present invention is not limited to these two image modification processes.

Figure 4:
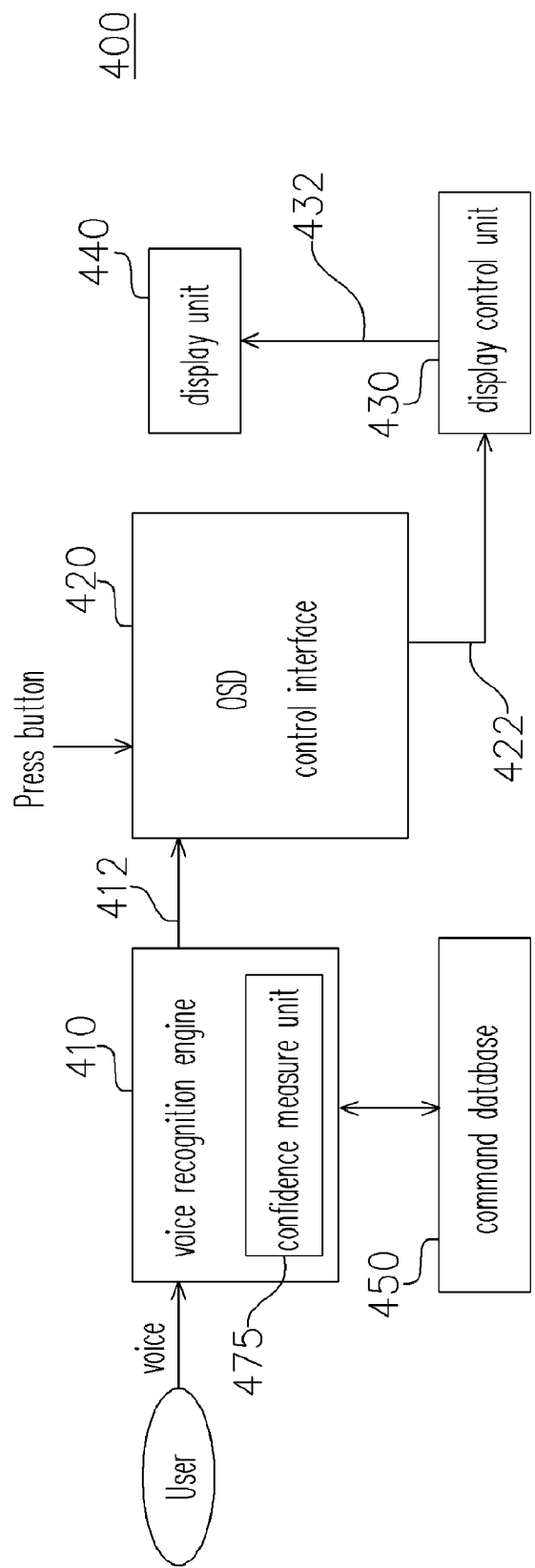
FIG. 4 is block diagram of a video device with a voice-assisted system in accordance with another preferred embodiment of the present invention.

FIG. 4 is block diagram of a video device with a voice-assisted system in accordance with another preferred embodiment of the present invention. Referring to FIG. 4, the video device 400 comprises a voice recognition engine 410, an OSD control interface 420, a display control unit 430 and a display unit 440. The voice recognition engine 410 is coupled to the OSD control interface 420. The display control unit 430 is coupled to the on-screen display control interface 420. The display control unit 430 controls the display of the display unit 440.

Unlike the embodiment in FIG. 2, the confidence measure unit 475 is designed in the voice recognition engine 410. The voice recognition engine 410 directly evaluates the recognition result "score" via the confidence measure unit 475 and outputs an estimation level. The estimation level then will be compared to the estimation threshold. The estimation level represents the similarity of recognition result to the corresponding voice signals in the command database. If the estimation level is higher than the estimation threshold, then it determines whether it is a specific command or a fuzzy command. If it is a specific command, then the command is sent to the OSD control unit 420 via the voice signal 412 and the display control unit 430 performs the subsequent adjustment action corresponding to the voice signal 412.

If the estimation level is lower than the estimation threshold, then voice recognition engine 410 via the OSD control interface 420 and the display control unit 430 displays on the display unit 440 several similar recognition results previously inputted by the user (i.e., the recognition results having higher similarity to this command) for the users choice. The user can give a voice command and press the button to select the correct recognition result. The present invention is not limited those two methods of selection.

After the user makes the selection, if it is a fuzzy command, the voice signal 412 is sent to the OSD control interface to find, from the command database 450, the command set corresponding to the fuzzy command. Then the display control unit 430 performs the subsequent adjustment actions corresponding to this fuzzy command.

In light of the above, the video device with a voice-assisted system can easily adjust the images. Hence, it is more convenient for the users to operate. Further, when the user gives the voice command but video device does not act responsive to the voice command, the present invention can make the video device perform a series of actions for adjusting images by analyzing and comparing the voice. After performing the image adjustment, those actions performed by the video device will be shown on the screen for the user to fine-tune the image parameters. Hence, the present invention is more flexible than the conventional method and thus can effectively reduce the operation complexity for the users.

In addition, because the voice-assisted system of the present invention includes a confidence measure unit to evaluate the recognition result performed by the voice recognition engine, i.e., to reassure the accuracy of the voice command. Hence, it can prevent wrong actions due to the low recognition rate so that the reliability of the system can be significantly improved.

The above description provides a full and complete description of the preferred embodiments of the present invention. Various modifications, alternate construction, and equivalent may be made by those skilled in the art without changing the scope or spirit of the invention. Accordingly, the above description and illustrations should not be construed as limiting the scope of the invention which is defined by the following claims.

The invention claimed is:

1. A method for adjusting images, suitable for adjusting a video device with a voice-assisted system, said video device providing an on-screen display function, said method comprising:
   receiving a voice command;
   recognizing said voice command and outputting a voice signal based on a result of recognizing said voice command; and
   identifying said voice command as one of a specific command and a fuzzy command based on said voice signal, wherein said fuzzy command performs a plurality of adjustment actions corresponding to said voice command, and if the adjusted image does not meet a user's expectation, the adjusted image is further modified based on the performed adjustment actions.

2. The method of claim 1, if said voice command is said specific command, further comprising performing one adjustment action corresponding to said voice command.

3. The method of claim 1, before said identifying step, further comprising: performing a confidence measure of said voice signal, outputting an estimation level based on said confidence measure, and comparing said estimation level with a predetermined estimation threshold.

4. The method of claim 3, wherein said comparing step includes:
   if said estimation level is higher than said predetermined estimation threshold, directly going to said step of identifying said voice command as a specific command or a fuzzy command based on said voice signal;
   if said estimation level is lower than said predetermined estimation threshold, displaying a plurality of commands based on said voice signal, a similarity of said plurality of commands to said voice command is higher than a predetermined vaule, selecting one of said plurality of commands, and going to said step of identifying said voice command as one of said specific command and said fuzzy command based on said voice signal.

5. The method of claim 4, wherein said step of selecting one of said plurality of commands includes selecting one of said plurality of commands by a voice input.

6. The method of claim 4, wherein said step of selecting one of said plurality of commands includes selecting one of said plurality of commands by a button input from said video device.

7. The method of claim 1, if said voice command is said fuzzy command, further comprising finding said plurality of adjustment actions corresponding to said voice command from a command database.

8. The method of claim 1, if said voice command is said fuzzy command, further comprising displaying performed adjustment actions corresponding to said voice command via said on-screen display function.

9. The method of claim 8, after said step of displaying said performed adjustment actions corresponding to said voice command via said on-screen display function, further comprising an image modification process.

10. The method of claim 9, wherein said image modification process includes selection by a voice input.

11. The method of claim 9, wherein said image modification process includes selection by a button input.

12. A video device with a voice-assisted system, comprising:
   a voice recognition engine receiving a voice command and outputting a voice signal based on said voice command;
   an on-screen display control interface, coupled to said voice recognition engine, receiving said voice signal;
   a display control unit coupled to said on-screen display control interface; and
   a display unit coupled to said display control unit, said on-screen display control interface based on said voice signal identifying said voice command as one of a specific command and a fuzzy command; wherein said fuzzy command performs a plurality of adjustment actions corresponding to said voice command to adjust an image displayed on said display unit, and if the adjusted image does not meet a user's expectation, the adjusted image is further modified based on the performed adjustment actions.

13. The device of claim 12, wherein if said voice command is said specific command, said display control unit performs an adjustment action corresponding to said voice command to adjust said image displayed on said display unit.

14. The device of claim 12, further comprising a confidence measure unit performing a confidence measure of said voice signal, outputting an estimation level based on said confidence measure, and comparing said estimation level with a predetermined estimation threshold.

15. The device of claim 14, wherein when comparing said estimation level with said predetermined estimation threshold,
   if said estimation level is higher than said predetermined estimation threshold, said on-screen display control interface directly identifies said voice command as one of a specific command and a fuzzy command based on said voice signal;
   if said estimation level is lower than said predetermined estimation threshold, said on-screen display control interface displays a plurality of commands based on said voice signal, a similarity of said plurality of commands to said voice command is higher than a predetermined value, said on-screen display control interface selects one of said plurality of commands, and said on-screen display control interface identifies said voice command as one of said specific command and said fuzzy command based on said voice signal.

16. The device of claim 15, wherein said on-screen display control interface selects one of said plurality of commands, said similarity of said plurality of commands to said voice command is higher than a predetermined value, via a voice input through said voice recognition engine.

17. The device of claim 15, wherein said on-screen display control interface selects one of said plurality of commands, said similarity of said plurality of commands to said voice command is higher than a predetermined value, via a button input of said video device.

18. The device of claim 14, wherein said confidence measure unit is disposed on said on-screen display control interface.

19. The device of claim 12, wherein if said voice command is said fuzzy command, said voice recognition engine finds said plurality of adjustment actions corresponding to said voice command from a command database.

20. The device of claim 12, if said voice command is said fuzzy command, said display control unit displays performed adjustment actions corresponding to said voice command via said on-screen display function.

21. The device of claim 20, wherein after displaying said performed adjustment actions corresponding to said voice command via said on-screen display function, said on-screen display control interface performs an image modification process.

22. The device of claim 21, wherein said image modification process includes said voice recognition engine selecting via a voice input.

23. The device of claim 21, wherein said image modification process includes selection by a button input from said video device.

24. A video device with a voice-assisted system, comprising:
a voice recognition engine receiving and recognizing a voice command and outputting a recognition result, said voice recognition engine including a confidence measure unit performing a confidence measure of said voice signal outputting an estimation level based on said confidence measure, comparing said estimation level with a predetermined estimation threshold to output a voice signal;
an on-screen display control interface, coupled to said voice recognition engine, receiving said voice signal;
a display control unit coupled to said on-screen display control interface; and
a display unit coupled to said display control unit, said on-screen display control interface based on said voice signal identifying said voice command as one of a specific command and a fuzzy command, if said voice command is said specific command, said display control unit performing an adjustment action corresponding to said voice command to adjust an image displayed on said display unit, if said voice command is said fuzzy command, said display control unit performing a plurality of adjustment actions corresponding to said voice command to adjust said image displayed on said display unit and if the adjusted image does not meet a user's expectation, the adjusted image is further modified based on the performed adjustment actions.

25. The device of claim 24, wherein when comparing said estimation level with said predetermined estimation threshold
if said estimation level is higher than said predetermined estimation threshold, said on-screen display control interface directly identifies said voice command as one of a specific command and a fuzzy command based on said voice signal;
if said estimation level is lower than said predetermined estimation threshold, said on-screen display control interface displays a plurality of commands based on said voice signal, a similarity of said plurality of commands to said voice command is higher than a predetermined value, said on-screen display control interface selects one of said plurality of commands, and said on-screen display control interface identifies said voice command as one of said specific command and said fuzzy command based on said voice signal.

26. The device of claim 25, wherein said on-screen display control interface selects one of said plurality of commands, said similarity of said plurality of commands to said voice command is higher than a predetermined value, via a voice input through said voice recognition engine.

27. The device of claim 25, wherein said on-screen display control interface selects one of said plurality of commands, said similarity of said plurality of commands to said voice command is higher than a predetermined value, via a button input of said video device.

28. The device of claim 24, wherein if said voice command is said fuzzy command, said voice recognition engine finds said plurality of adjustment actions corresponding to said voice command from a command database.

29. The device of claim 24, if said voice command is said fuzzy command, said display control unit displays performed adjustment actions among said plurality of adjustment actions corresponding to said voice command via said on-screen display function.

30. The device of claim 29, wherein after displaying said performed adjustment actions said plurality of adjustment actions corresponding to said voice command via said on-screen display function, said on-screen display control interface performs an image modification process.

31. The device of claim 30, wherein said image modification process includes said voice recognition engine selecting via a voice input.

32. The device of claim 30, wherein said image modification process includes selection by a button input from said video device.

* * * * *